United States Patent
Schubert et al.

(10) Patent No.: US 9,293,058 B2
(45) Date of Patent: *Mar. 22, 2016

(54) VEHICLE CREW TRAINING SYSTEM FOR GROUND AND AIR VEHICLES

(71) Applicant: Raydon Corporation, Port Orange, FL (US)

(72) Inventors: Kevin Schubert, Edgewater, FL (US); Sean Moran, Ormond Beach, FL (US); Greg Wieboldt, Ormond Beach, FL (US); Donnie Klein, Ormond Beach, FL (US); Mark Haack, Ormond Beach, FL (US); Sharon Lay, Daytona Beach, FL (US); Chris Howard, Daytona Beach, FL (US); Michael Dineen, Deltona, FL (US); Jerry R. Hubbard, Port Orange, FL (US); William Araki, Port Orange, FL (US)

(73) Assignee: Raydon Corporation, Port Orange, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/331,103

(22) Filed: Jul. 14, 2014

(65) Prior Publication Data
US 2015/0010886 A1 Jan. 8, 2015

Related U.S. Application Data

(63) Continuation of application No. 11/439,423, filed on May 24, 2006, now Pat. No. 8,777,619.

(51) Int. Cl.
*F41A 33/00* (2006.01)
*G09B 9/00* (2006.01)
*F41G 3/26* (2006.01)
*G09B 9/04* (2006.01)

(52) U.S. Cl.
CPC ............... *G09B 9/003* (2013.01); *F41A 33/00* (2013.01); *F41G 3/26* (2013.01); *G09B 9/04* (2013.01)

(58) Field of Classification Search
USPC ...................................... 434/11, 16
See application file for complete search history.

(56) References Cited

U.S. PATENT DOCUMENTS

| 5,347,910 | A | * | 9/1994 | Avila et al. ................. 89/41.22 |
| 5,444,624 | A | * | 8/1995 | Wilkinson et al. ................. 703/8 |
| 5,513,131 | A | * | 4/1996 | Wilkinson et al. ................. 703/8 |
| 5,580,249 | A | * | 12/1996 | Jacobsen et al. ................. 434/11 |

(Continued)

OTHER PUBLICATIONS

Office of Technology Assessment, Distributed Interactive Simulation of Combat, Sep. 1995, Congress of the United States, GPO stock #052-003-01428-9; OTA-BP-ISS-151; 1-61 pages.*

*Primary Examiner* — Kesha Frisby
(74) *Attorney, Agent, or Firm* — Miles & Stockbridge P.C.

(57) ABSTRACT

A computer based simulation system for virtual training for vehicle crews is disclosed. The Vehicle Crew Training System (VCTS) simulates crew positions for different military ground and air vehicles. Two or more crewman modules are networked together to support a partial or full vehicle crew. The crewman modules are self-contained devices that are modular in hardware and software design, easily reconfigurable, and require minimal facility space, allowing use in restricted environments such as trailers. The VCTS is modular at the crew position level; crewman modules are added or deleted as required to meet a particular training need.

12 Claims, 8 Drawing Sheets

(56) References Cited

U.S. PATENT DOCUMENTS

| | | | |
|---|---|---|---|
| 5,648,623 A * | 7/1997 | Silverstein et al. | 84/383 R |
| 6,053,736 A * | 4/2000 | Huffman et al. | 434/11 |
| 6,611,822 B1 * | 8/2003 | Beams et al. | 706/11 |
| 2002/0072414 A1 * | 6/2002 | Stylinski et al. | 463/42 |
| 2003/0211450 A1 * | 11/2003 | Sofia et al. | 434/350 |
| 2005/0017977 A1 * | 1/2005 | Simpson et al. | 345/473 |
| 2006/0183083 A1 * | 8/2006 | Moran et al. | 434/11 |
| 2007/0287133 A1 * | 12/2007 | Schubert et al. | 434/11 |

* cited by examiner

| | Pilot | Driver | Gunner | Commander and Observer/Rifleman |
|---|---|---|---|---|
| Weapon System | Not Applicable | Not Applicable | CAL .50 machine gun, MK-19 grenade launcher, M240B 7.62 mm machine gun, M249 Semi-Automatic Weapon | M-16 rifle, M-4 rifle; virtual dismount is supported |
| Vehicle Control System | Force feedback flight controller with joystick and throttle | Steering wheel, transmission selector, brake and accelerator pedals | Not Applicable | Not Applicable |
| Display System | LCD Panel(s) | LCD Panel(s) | LCD Panel or HMD | HMD |
| Sound System | Amplified speakers with vehicle & weapon sounds | Amplified speakers with vehicle & weapon sounds | Amplified speakers with vehicle & weapon sounds | Amplified speakers with vehicle & weapon sounds |
| Computational System | 1 or more PC's with host and visual software | 1 or more PC's with host and visual software | 1 or more PC's with host and visual software | 1 or more PC's with host and visual software |

VEHICLE CREW TRAINING SYSTEM FOR GROUND AND AIR VEHICLES

CROSS-REFERENCE TO RELATED APPLICATIONS

The present application is a continuation of U.S. patent application Ser. No. 11/439,423 (issuing as U.S. Pat. No. 8,777,619), which is incorporated herein by reference in its entirety.

BACKGROUND OF THE INVENTION

1. Field of the Invention

The invention pertains to training simulators.

2. Background Art

System Design

Historically, most virtual crew training has been accomplished with appended trainers or with crew station trainers. An appended trainer consists of equipment added to an actual (parked) combat vehicle such that the vehicle is used to train a full or partial crew in a virtual environment. Examples are Raydon's Abrams Appended Trainer (A-FIST XXI) and the Bradley Appended Trainer (AB-FIST). A crew station trainer includes a replica of a crew compartment of an actual vehicle. Examples are Raydon's M-COFT XXI and SIMNET XXI trainers for the Abrams Tank and the Bradley Fighting Vehicle. The appended and crew station trainers typically provide higher fidelity and very little modularity. Here, fidelity refers to the physical and functional realism of the man-machine interface; specifically, the realism of the vehicle and/or weapon controls in terms of numbers of controls and control realism; the realism of visual imagery in terms of field of view, resolution, and scene content; and the realism of the physical crew position in terms of the human support structure. Further, these trainers tend to be purpose-built for either individual/crew training or for collective training, but not both.

More recently, desktop training systems have emerged that are capable of training individuals and crews of military combat vehicles with less fidelity but at a much lower cost than the appended and crew station trainers. However, these desktop systems are not modular, and like the higher fidelity appended and crew station trainers, tend to be purpose-built for either individual/crew training or for collective training, but not both.

Hence there is a need for a vehicle crew training system that is sufficiently flexible to allow both individual/crew training and collective training, is modular, and can provide any level of fidelity.

Gunner Module For Ground Vehicles

Current ground vehicle simulators for mounted weapons training use video projection screens and a fixed mount weapon mockup. Taken together this results in a limited field of view for the gunner; i.e., the gunner can only look and shoot at scenes depicted on the projection screen. Typically these screens are limited to the forward direction only.

This approach also requires substantial space to implement, making it impractical to use in standard trailers or portable shelters. One instantiation of this approach was implemented by the U.S. Government at the Mounted Warfare Testbed at Fort Knox, Ky. Another instantiation of this approach was implemented by Lockheed Martin for the Government's Virtual Combat Convoy Trainer program.

Hence there is a need for a mounted weapon training simulator module that has a relatively small physical footprint, yet provides realistic perspective, i.e., in all possible directions, for a trainee's view and aim.

BRIEF SUMMARY OF THE INVENTION

System Design

The Vehicle Crew Training System (VCTS) is a computer based simulation system intended to serve the virtual training needs of military users. However, unlike other simulation systems, the VCTS is modular at the crew position level; crewman modules are added or deleted as required to meet a particular training need. The VCTS provides virtual training for vehicle crew members. Virtual training refers to a mode of training in which the trainee is immersed in a simulated environment as a participating entity and in which results of all actions occur in real-time based on cause and effect. This is also referred to as real-time, man-in-the-loop simulation. Three modes of virtual training are supported: individual training, crew training, and collective training with multiple vehicle crews. The VCTS is able to simulate crew positions for different military vehicles and their associated weapon systems. The VCTS comprises crewman modules networked together to support a partial or full vehicle crew. Moreover, not only is the VCTS modular, but each crewman module is itself modular. The crewman modules are self-contained devices that are modular in hardware and software design, and easily reconfigurable. In addition, the crewman modules occupy a minimal physical footprint.

One instantiation of the VCTS is a High Mobility Multipurpose Wheeled Vehicle (HMMWV) trainer developed by Raydon Corporation. This system can be used for individual and crew gunnery as well as convoy training in a simulated geographical environment. In an embodiment of the invention, the simulated environment corresponds to an actual urban or rural setting. Future VCTS ground vehicle variants include but are not limited to the Heavy Expanded Mobility Tactical Truck (HEMTT), the Standard Cargo Truck, and the Five Ton Tactical Truck.

Another instantiation of the VCTS is a UH-60 Blackhawk helicopter trainer developed by Raydon Corporation. This system can be used for individual and crew gunnery as well as convoy support training in a simulated geographical environment. In an embodiment of the invention, the simulated environment corresponds to an actual urban or rural setting. Future VCTS air vehicle variants include but are not limited to the CH-47 Chinook helicopter.

The VCTS consists of two or more crewman modules networked together. A typical set of crewman modules comprising a VCTS includes a driver or pilot module, a gunner module, and a commander module. Via a network, other devices, such as an instructor station and a simulated radio, may be integrated with the VCTS. Additional crewman modules may be added for other crew members such as an observer/riflemen. Vehicle Crew Training Systems may also be linked together to form groups of simulated vehicles, such as platoons of three of four vehicles, where each vehicle is configured with two or more crewman modules. Two instructor stations may be included in these larger embodiments, to facilitate training simultaneously with the conduct of after action reviews (AARs) of previously conducted exercises. Additional instructor stations may be added to facilitate individual and crew training.

Various embodiments of the invention, therefore, may or may not interface with an instructor station. However, an instructor station can be an important component of the overall training system. In embodiments where it is included, it initializes the different VCTS crewman modules, monitors the performance of the trainees, controls the operation of the simulated enemy and friendly forces during the various training exercises, and records all exercise events. In addition, the instructor station supports the conduct of after action reviews wherein previously conducted exercises are played back as an aid to the instructor's critique of trainee performance. An instructor station can also act as a surrogate driver module in the absence of a regular driver module, or as a surrogate for any other missing crewmember module. If two instructor stations are included, then it is possible to perform the exercise control and monitoring functions with the AAR function simultaneously.

The Vehicle Crew Training System is designed in a modular fashion such that it may be reconfigured to meet different training needs. Reconfiguration may involve adding, deleting, or changing the mix of crewman modules. Modularity also extends to the design of the crewman modules such that the weapon system and/or the vehicle type may be rapidly changed. For example, a .50 caliber machine gun in use on the HMMWV variant of the Vehicle Crew Training System can be interchanged with an MK-19 grenade launcher, a 7.62 mm machine gun, an M249 Squad Automatic Weapon, or a Tube-launched Optically tracked Wire-guided (TOW) missile launcher, for example.

An embodiment of the invention can consist of four (4) simulated HMMWV vehicles, each represented by a VCTS with five (5) crewman modules. Two (2) instructor stations and simulated radios can be interfaced with such an embodiment of the VCTS through a network. The system provides individual, crew and collective training to platoons of HMMWV drivers, commanders, gunners and observer/riflemen.

Another embodiment of the VCTS is a HMMWV Training System developed for the US Army National Guard (ARNG). This system can consist of five (5) simulated HMMWV vehicles, where four of the vehicles are represented by VCTS's consisting of two (2) crewman modules each and the fifth vehicle (external to the trailer containing the VCTS systems) is represented by an Appended HMMWV containing a driver and gunner position. Simulated radios and an instructor station can also be interfaced to the VCTS. The system provides individual, crew and collective training to platoons of HMMWV drivers and gunners. The VCTS modules and the instructor station of this embodiment fit in one fifty-three foot semi-trailer.

Another embodiment of the VCTS is a UH-60 Blackhawk helicopter training system developed for the US Army. This system can consist of two (2) simulated UH-60 helicopters, where each of the helicopters are represented by VCTS's consisting of three (3) crewman modules: a pilot module, a left door gunner module, and a right door gunner module. Simulated radios and an instructor station can also be interfaced to the VCTS. The system provides individual, crew and collective training to UH-60 door gunners. The VCTS modules and the instructor station of this embodiment fit in one fifty-three foot semi-trailer.

The VCTS is designed to fit in a very constrained space, such as a semi-trailer or a portable shelter. The UH-60 trainer just described fits in one fifty-three foot semi-trailer.

The ground vehicle variant of the gunner module embodies a unique approach to weapon system training for simulated ground vehicles. It provides an unrestricted view of the simulated environment to the gunner by means of a head mounted display (HMD) and a moveable, vehicle-mounted weapon mock-up. The HMD provides a complete spherical (360 degree) field of regard (FOR) to the gunner; as the gunner moves his head, the instantaneous field of view (IFOV) changes in relation to the direction his head is pointed. The weapon mock-up is cradle/pintle-mounted on a 360 degree traverse ring to allow full 360 degree horizontal traverse as well as the authentic amount of weapon pitch and yaw. External cabling is routed through a slip ring to allow unlimited rotations of the traverse ring. In addition, weapon mock-ups and the weapon software may be easily changed to simulate different vehicle-mounted weapons. Finally, the gunner module is very compact in size, allowing use in restricted environments such as trailers and mobile shelters.

Crewman modules may be of varying fidelity. For example, a lower fidelity desktop version of the gunner module may be used instead of the simulated crew position version described above. Fidelity in this context refers to the fidelity or realism of the man-machine interface as experienced by the trainee, i.e., the fidelity of the vehicle and/or weapon controls in terms of numbers of controls and the realism of the controls, the fidelity of visual imagery in terms of field of view, resolution, and scene content, and the fidelity of the physical crew position in terms of the human support structure.

The VCTS architecture supports any mix of varying fidelity crewman modules. Since the lower fidelity desktop versions provide subsets of the capabilities embodied in the simulated crew position versions, all discussions of crewman module will refer to the higher fidelity variants, unless specifically stated otherwise.

DETAILED DESCRIPTION OF THE INVENTION

Embodiments of the invention are discussed in detail below. In describing embodiments, specific terminology is employed for the sake of clarity. The invention is not intended to be limited to the specific terminology so-selected. While specific exemplary embodiments are discussed, it should be understood that this is done for illustration purposes only. A person skilled in the relevant art will recognize that other components and configurations can be used without departing from the spirit and scope of the invention.

Figure 1A:
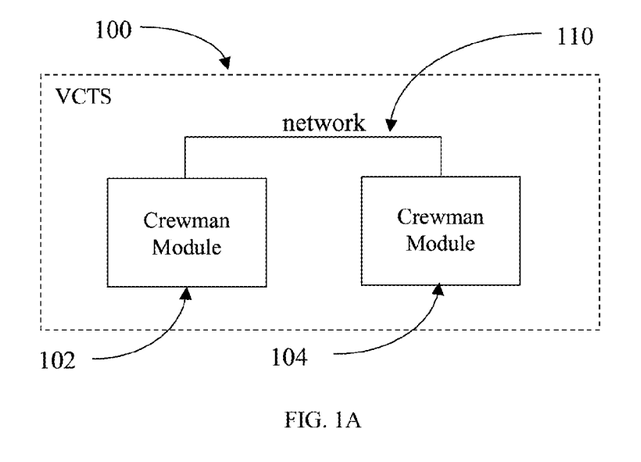
FIG. 1A is a diagram illustrating the minimum system configuration of the Vehicle Crew Training System (VCTS), according to an embodiment of the invention.
Figure 1B:
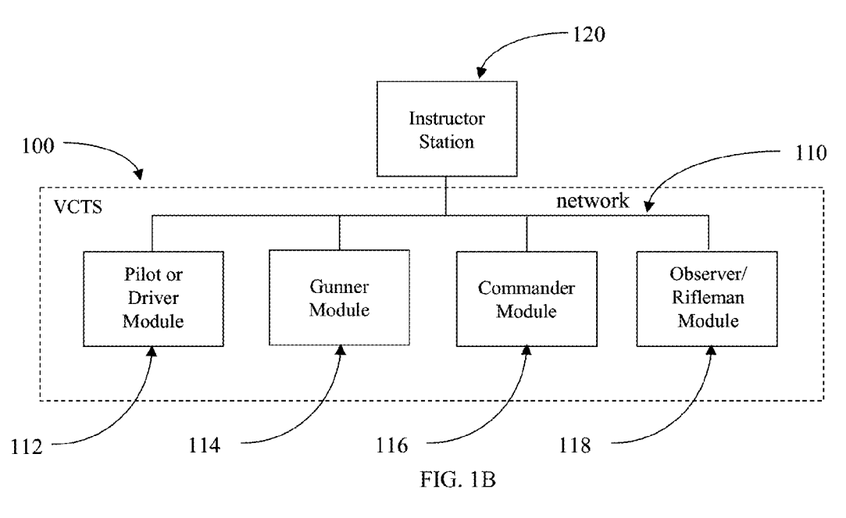
FIG. 1B is a diagram illustrating a typical full crew configuration of the VCTS, according to an embodiment of the invention.
Figure 1C:
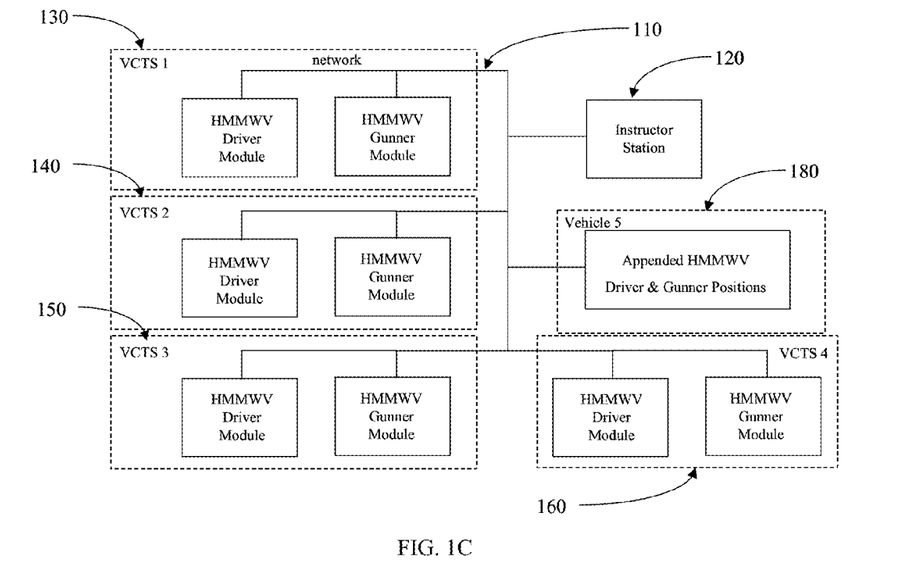
FIG. 1C is a diagram illustrating multiple VCTS systems linked together to support collective training for High Mobility Multipurpose Wheeled Vehicle (HMMWV) crews, in accordance with the embodiments of FIGS. 1A and 1B; this configuration is representative of a VCTS training system developed for the US Army National Guard.
Figure 1D:
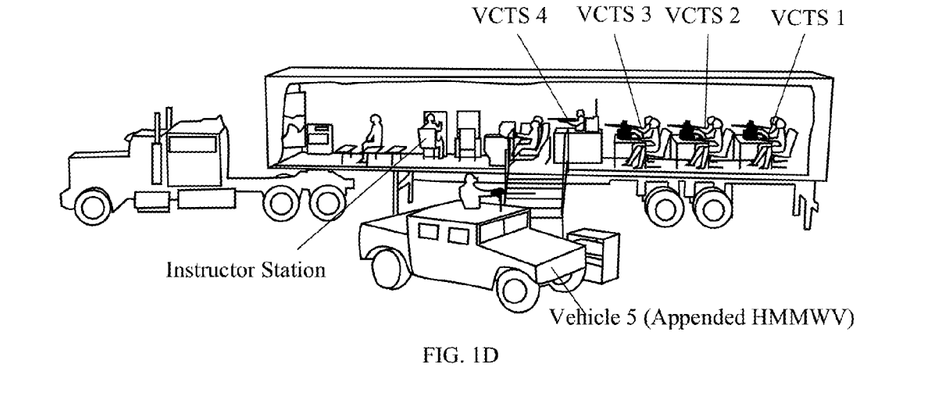
FIG. 1D is an artist's drawing of the system diagrammed in FIG. 1C.

FIGS. 1A, 1B, 1C, 1D, 1E and 1F illustrate various embodiments of a VCTS system in accordance with the present invention. The system is comprised of at least two crewman modules 102 and 104 connected via a network 110, as illustrated in FIG. 1A. crewman modules may include a driver module, pilot module, ground vehicle gunner module, air vehicle door gunner module, commander module, and observer/rifleman module. Other crewman module types can be supported as needs dictate. These other modules could include, for example, alternate driver modules, crowd control/riot control modules, and non-lethal weapon modules. An embodiment of the system that supports a four man crew is illustrated in FIG. 1B; this configuration of the system includes a driver or pilot module 112, a gunner module 114, a commander module 116, an observer/rifleman module 118, and a network 110. An instructor station 120 is shown connected to the VCTS 100; the instructor station 120 provides exercise control, monitoring and evaluation. An embodiment of the invention that supports collective training for ground vehicles is illustrated in FIG. 1C; four VCTS systems 130-160, each consisting of a driver module and a gunner module, and linked via a network 110, representing four vehicle crews. The four VCTS systems are linked via network 110 to an instructor station 120 and to an appended trainer 180 which supports a fifth vehicle crew. An artist's sketch of this system is shown in FIG. 1D. Crewman modules that provide training with respect to ground vehicles are referred to as ground vehicle crewman modules.

Figure 1E:
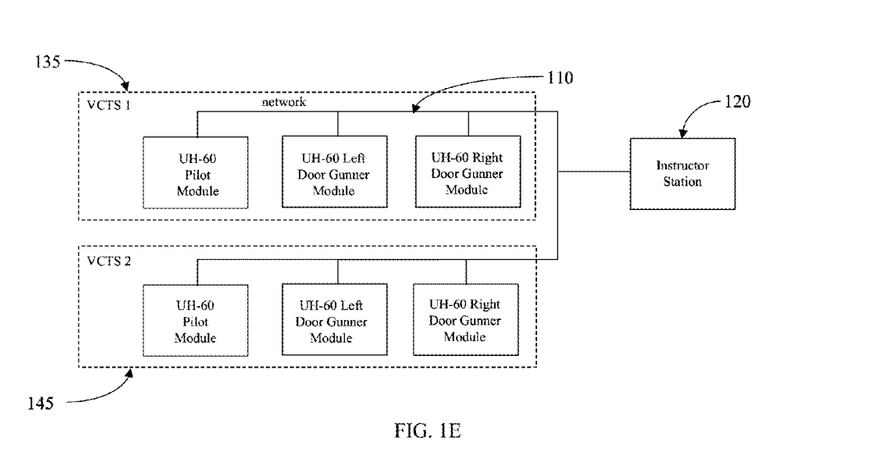
FIG. 1E is a diagram illustrating multiple VCTS systems linked together to support collective training for UH-60 aircraft crews, in accordance with the embodiments of FIGS. 1A and 1B; this configuration is representative of a VCTS training system developed for the US Army.
Figure 1F:
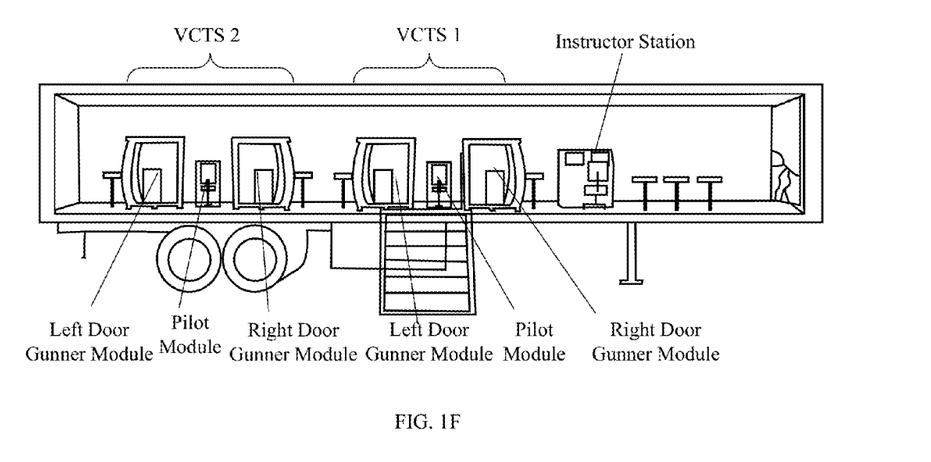
FIG. 1F is an artist's drawing of the system diagrammed in FIG. 1E.

An embodiment of the invention that supports collective training for air vehicles is illustrated in FIG. 1E; two VCTS systems 135 and 145, each consisting of a pilot module and two door gunner modules, and linked via a network 110, represent two vehicle crews. The two VCTS systems are linked via the network 110 to an instructor station 120. An artist's sketch of this system is shown in FIG. 1F. Crewman modules that provide training with respect to air vehicles are referred to as air vehicle crewman modules.

Figure 2A:
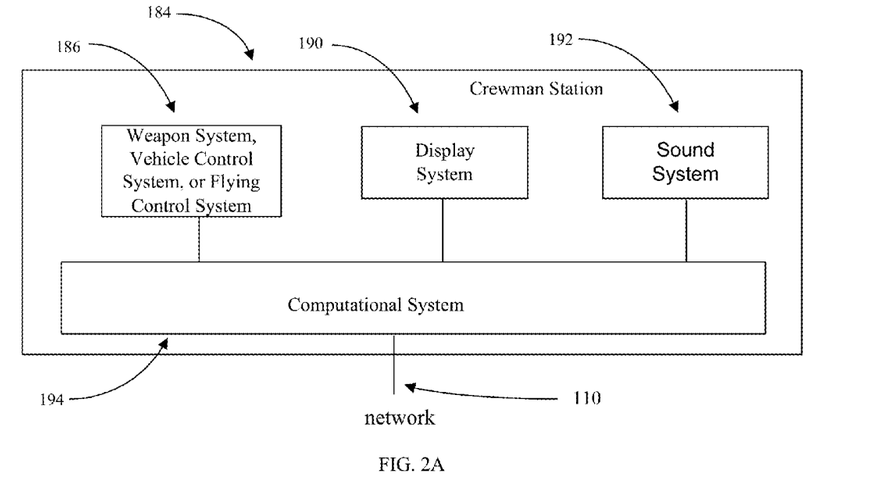
FIG. 2A is a diagram showing the major components of a VCTS crewman module, in accordance with the embodiment of FIG. 1.
Figure 2B:
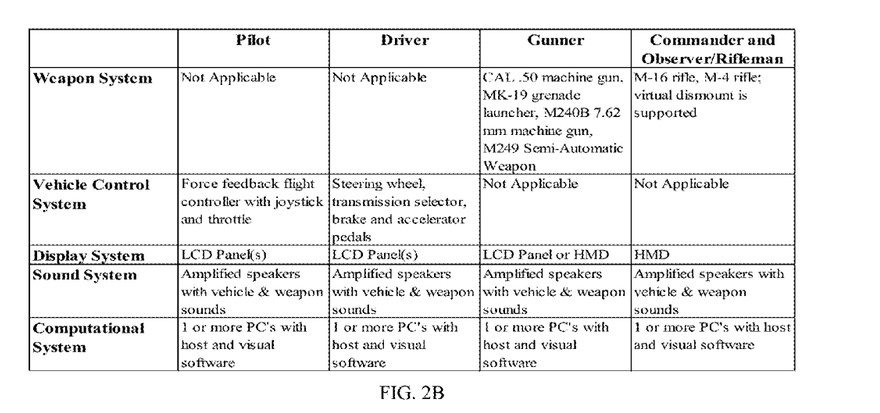
FIG. 2B is a table identifying the types and components that comprise a VCTS crewman module, in accordance with the embodiment of FIG. 2A.

FIGS. 2A and 2B illustrate the components and characteristics of an embodiment of a VCTS crewman module 184. Crewman modules are self-contained training devices that contain the necessary hardware and software to support virtual training for a single crewman. In an embodiment of the invention, a crewman module consists of a simulated weapon system 186 or, in the case of a driver or pilot module, a vehicle control or flying control system, respectively, plus a display system 190, a sound system 192, a computational system 194, and a crewman station from which a trainee can access systems 186, 190, and 192. A simulated weapon system 186 can consist of a weapon mock-up including all necessary controls such as triggers and arm/safe switches, and the electronics and cabling required to interface it with the computational system 194. A simulated vehicle control system for a ground vehicle consists of a steering wheel, transmission selector, brake and accelerator pedals, and all other necessary controls, electronics and cabling required to drive the vehicle and to interface with the computational system 194. A flying control system would similarly comprise simulated flight controls to control a virtual aircraft, e.g., controls for throttle, rotor speed, pitch, navigation instruments, etc. Display system 190 consists of display devices, such as head mounted displays and/or LCD panels, and the necessary electronics and cabling required to interface it with the computational system 194. Sound system 192 consists of amplified speakers and the necessary audio cabling to interface it with the computational system 194. Weapon and vehicle sounds are broadcast to the trainee via the sound system 192. The computational system 194 consists of a commercially available PC (or a programmable computing platform of comparable capability) augmented with standard devices and ports to enable communication with other crewman module hardware components, with other crewman modules, and with external systems such as instructor stations and other external simulated vehicles. Note that all programmable computing platforms that can be used in computational system 194 will be denoted generically hereinafter as PCs. The crewman station consists of the physical structure that contains and/or supports the trainee as well as all of the components that comprise a crewman module 184.

The computational system 194 contains the crewman module software. In an embodiment of the invention, the crewman module software consists of a commercially available operating system and application software. The major functions performed by the application software include simulating vehicle movement, weapon aiming, firing, and impact effects, image generation of visual scenes, interfacing with the various hardware components, and interfacing with other crewman modules and with external systems, such as other external simulated vehicles, via the network. The application software in the driver module has the additional functions of calculating collisions with other objects in the virtual world and of terrain following by the driver's virtual vehicle.

Figure 3:
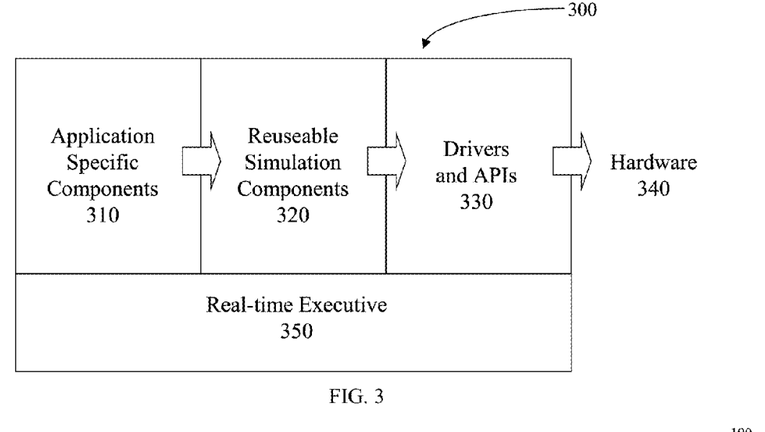
FIG. 3 is a diagram illustrating the componentized architecture of the VCTS software, in accordance with the embodiments of FIGS. 1 and 2.

FIG. 3 illustrates the VCTS application software architecture 300 according to an embodiment of the invention. The software architecture 300 can be an object oriented design comprised of components, which are encapsulated pieces of software with a defined functional purpose and a defined interface. The purpose of componentizing the application software is to minimize rework and maximize reuse as new vehicles and new weapons are incorporated into the VCTS design.

Software components may be categorized as either being application-specific or reusable. If the latter, they are placed into a library of reusable components 320. In an embodiment of the invention, an application specific component 310 generally links to one or more reusable components 320 to perform a given function. A collection of drivers and application program interfaces (APIs) 330 may also be included with the application software to interface with the hardware 340. This includes drivers for the video and data acquisition cards housed in the PC as well as network, joystick and sound drivers and the API for the visual software. Underlying the components, drivers and API's is the real-time executive software 350 that provides the universal means for components, drivers and API's to communicate via messages, events, and data reflection through its interface. The real-time executive software 350 can also be componentized.

Figure 4A:
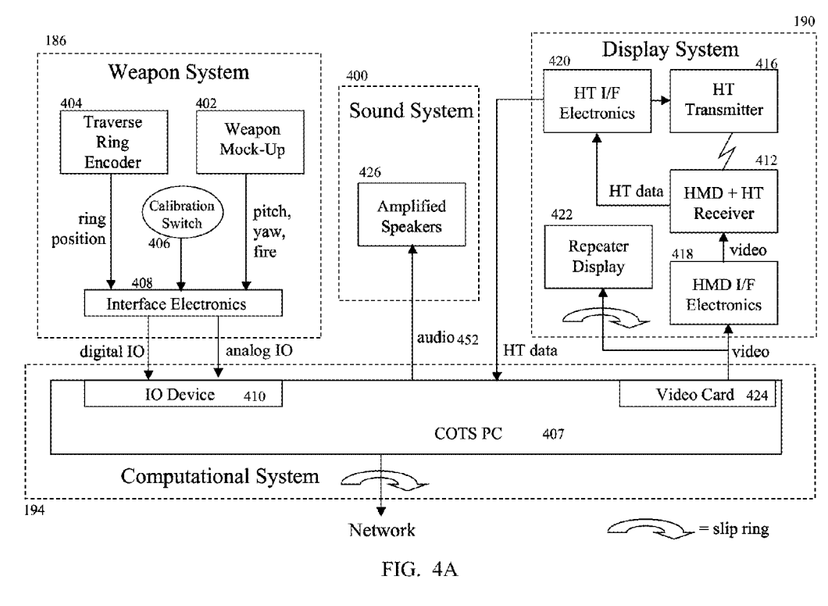
FIG. 4A is a functional block diagram of the VCTS HMMWV gunner module hardware in accordance with the embodiments of FIGS. 1, 2, and 3.
Figure 4B:
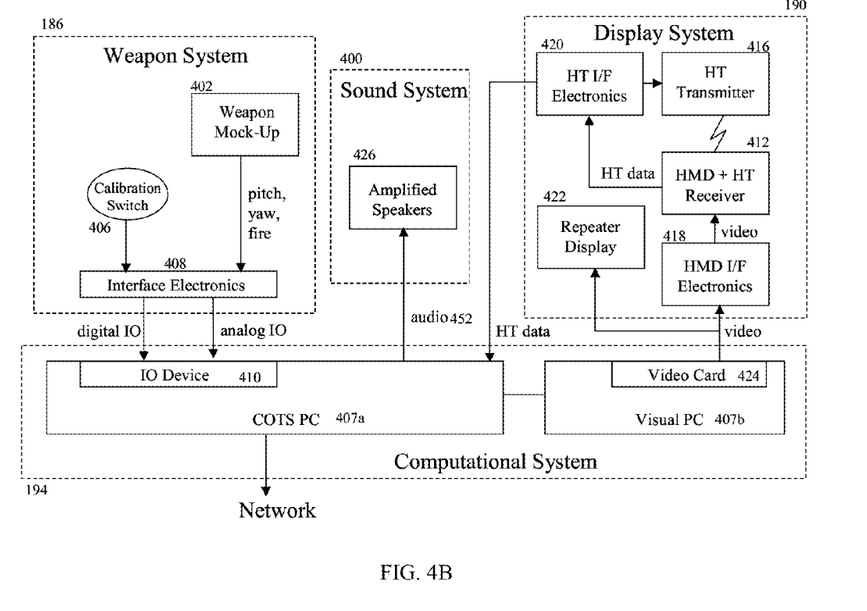
FIG. 4B is a functional block diagram of the VCTS UH-60 Door gunner module hardware in accordance with the embodiments of FIGS. 1, 2, and 3.
Figure 4C:
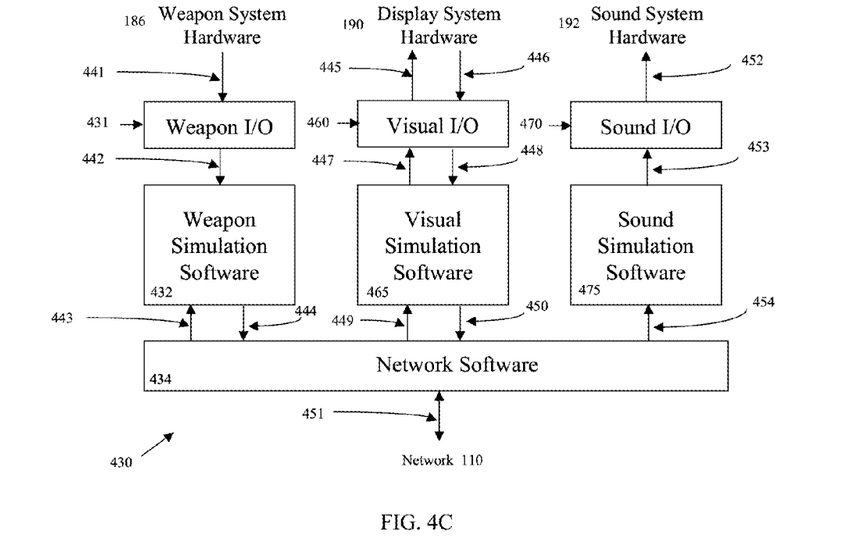
FIG. 4C is a functional software diagram of the VCTS gunner module in accordance with the embodiments of FIGS. 1, 2 and 3.

FIG. 4A is a functional hardware diagram of an embodiment of the ground vehicle gunner module, FIG. 4B is a functional hardware diagram of an embodiment of the air vehicle gunner module and FIG. 4C is a functional software diagram that corresponds to both the ground and air variants of the gunner module. In FIG. 4A, the illustrated weapon system 186 is comprised of the weapon mock-up 402, the traverse ring encoder 404, calibration switch 406, and interface electronics 408. The weapon mock-up 402, in one embodiment of the invention, is a simulated .50 caliber machine gun. The position, pitch and yaw of the weapon mock-up 402 are measured continuously, and fed back to the PC 407 via the interface electronics 408. The calibration signal is fed back to the PC 407 via the interface electronics 408 when the trainee pushes the corresponding switch 406. The interface electronics 408 applies signal conditioning to the incoming signals and sends the data to the IO device 410 in the PC 407.

In FIG. 4B, the illustrated weapon system 186 is comprised of the weapon mock-up 402, calibration switch 406, and interface electronics 408. The weapon mock-up 402, in one embodiment of the invention, is a simulated 7.62 mm machine gun. The position, pitch and yaw of the weapon mock-up 402 are measured continuously, and fed back to the PC 407a via the interface electronics 408. The calibration signal is fed back to the PC 407a via the interface electronics 408 when the trainee pushes the corresponding switch 406. The interface electronics 408 applies signal conditioning to the incoming signals and sends the data to the IO device 410 in the PC 407a. Note that in an embodiment of the invention, a traverse ring encoder may not be necessary. If, for example, weapons system 186 is meant to simulate a helicopter door gunner position, then a traverse ring may not be used. Moreover, in an embodiment of the invention a second PC may be used, shown in FIG. 4B as visual PC 407b. This PC would be used in conjunction with display system 190 and is in communication with other components of the system. The use of a second PC provides additional computing power and speed, particularly in the context of image processing.

Referring to FIG. 4C, weapon I/O software 431 in the PC 407 receives the data 441 from the IO device 410 in the PC 407, formats it, and outputs the formatted weapon data 442 to the weapon simulation software 432. Weapon data 442 is received continuously and includes weapon position, pitch, yaw and trigger pull. The calibration signal is sent only during the weapon calibration process. The weapon simulation software 432 computes a trajectory for the bullets and outputs projectile position data 444 to the network software 434. The weapon simulation software 432 receives own-vehicle state data 443 continuously from the network software. This data is used to compute the position of the weapon in the virtual world.

In the illustrated embodiments for both the ground and air vehicles, the display system 190 is comprised of a head mounted display (HMD) with an attached head tracker (HT) receiver (collectively, reference 412), an HT transmitter 416 mounted above the gunner position, and the HMD and HT interface electronics (references 418 and 420, respectively). In addition, an LCD panel 422 is provided to serve as a video repeater for the benefit of the instructor. In these embodiments of the invention, an acoustic, inertial and/or magnetic HT system senses the position and attitude of the HMD and continuously feeds the data to the PC 407 via an HMD/HT data interface (not shown). The HT data 446 is continuously input to the visual I/O software 460 where it is formatted and then output (see 448) to the visual simulation software 465. The visual simulation software 465 uses the HT data 446 to determine the position and look angle of the head relative to the visual scene that is displayed to the trainee wearing the HMD. In an embodiment of the invention, the visual simulation software 465 also performs the following functions:

Rendering of the visual scene according to the HT supplied look angle in data 448 and according to the own-vehicle state information in data 449 received from the network software 434;

Full color, perspectively correct, anti-aliased and textured image generation;

Imagery affected by atmospheric and weather effects;

Night vision simulation;

Rendering of other vehicles according to vehicle state information in data 449 received from the network software 434;

Input of own-weapon projectile information in data 449 and subsequent impact detection processing;

Weapon effect generation and rendering based on own-weapon projectile impact detection;

Weapon effect generation and rendering based on weapon impact information in data 449 received from the network software 434;

Output of own-vehicle weapon impact and collision data 450 to the network software 434;

Collision detection of the own-vehicle with other objects in the virtual world;

Terrain following by the own-vehicle; and

Output of video 447 to the visual I/O software 460.

The visual I/O software 460 formats the video and sends it to the video card 424 in the PC 407; the video 445 is then output to the display system 190 as standard VGA video. In other embodiments of the invention, other video data formats can be used.

In the illustrated embodiment, the network software 434 sends and receives data 451 to and from the network 110. Data sent to the network 110 includes projectile state data received from the weapon simulation software 432, and weapon impact and collision data received from the visual simulation software 465. Data received from the network 110 includes own-vehicle state data plus the state of all other vehicles and projectiles that are active in the virtual environment.

In both the ground and air embodiments of the invention, a sound system 400 generates aural cues synchronized with and representative of actions and events in the virtual environment. Sounds can be caused by, for example, own vehicle and other vehicle movements, own weapon and other weapon firing, weapon impacts and explosions caused by own weapons or other weapons, and could even include environmental "noise" such as crowd noise.

The sound system 400 includes amplified speakers 426 that receive audio 452 from the PC 407 via standard audio cables in an embodiment of the invention. The sound I/O software 470 is a sound driver that receives the sound data 453 from the sound simulation software 475 and formats it for use by the standard sound hardware in the PC 407. The sound simulation software 475 creates sounds based on weapon and vehicle state data 454 that is received from the network software 434. Sound files representing different battlefield sounds can be created off-line and then stored in a sound file library; during real-time the sound simulation software 475 accesses the appropriate sound files and weights them appropriately to create aural cues for the trainee.

In both the ground and air embodiments of the invention, the computational system 194 consists of, for example, a commercially available PC equipped with at least 2 GB of main memory and a Pentium 4 CPU; Windows XP may be used as the operating system. In these embodiments, the IO device 410 is a commercially available device that supports both analog and digital signals. The video card 424 may be a commercially available PCI graphics card in an embodiment of the invention.

Figure 5A:
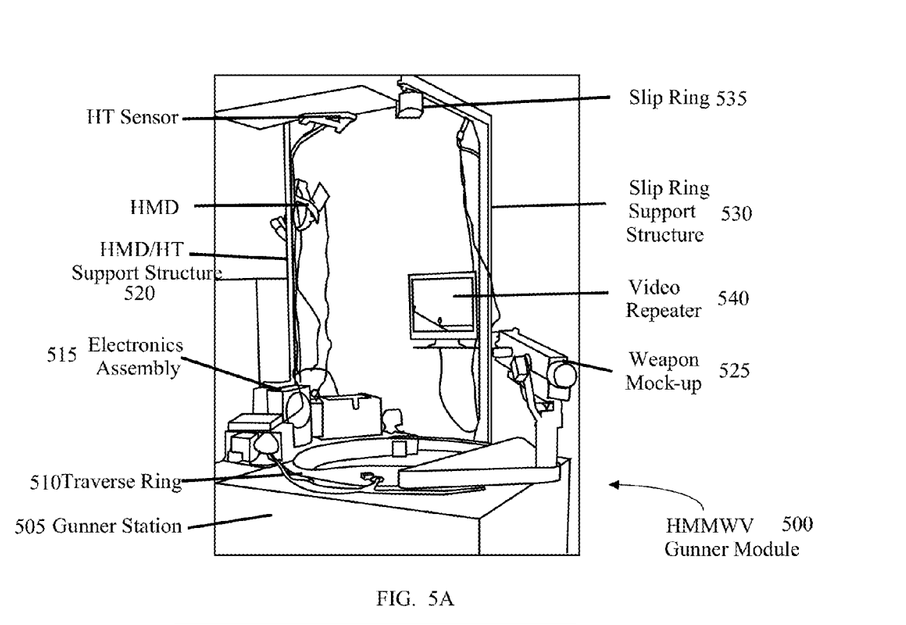
FIG. 5A is a photograph of the VCTS HMMWV gunner module in accordance with the embodiments of FIGS. 1, 2, 3, and 4A.

FIG. 5A is a photograph illustrating the overall mechanical design of an HMMWV gunner module 500 according to an embodiment of the invention. The gunner module 500 is built on a gunner station 505, which can be a large aluminum box with a large circular hole cut in the top panel. A traverse ring 510 is fastened to the top of the box. The traverse ring 510 consists of a pallet carousel modified for use with the gunner module 500. The electronics assembly 515, the HMD/HT support structure 520 and the weapon mock-up 525 are attached to the traverse ring 510 such that they move with the traverse ring 510 in response to trainee pressure. The slip ring support structure 530 is attached to the gunner station 505, such that it remains fixed in space regardless of traverse ring 510's rotation. The slip ring 535 and the video repeater 540 are attached to this support structure 530.

Figure 5B:
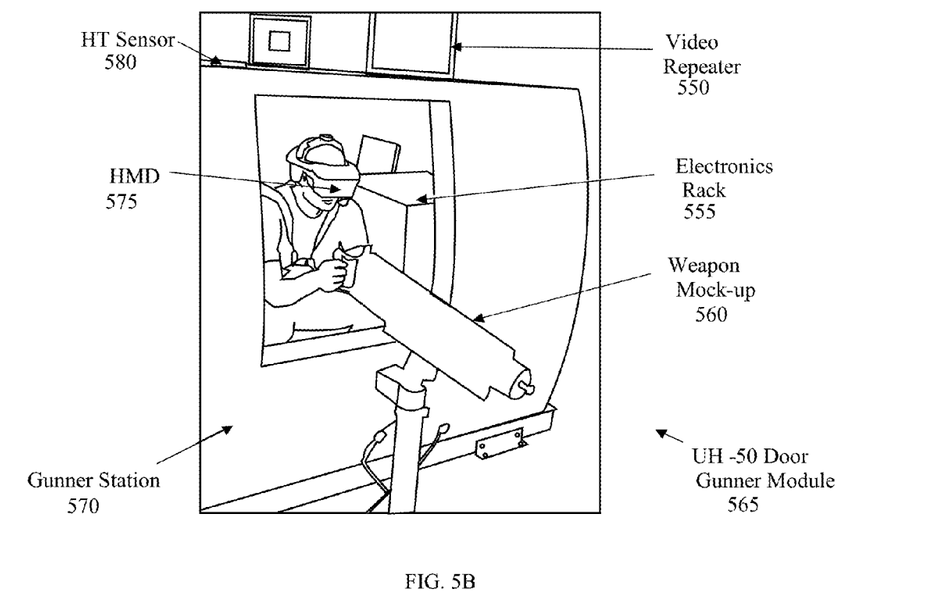
FIG. 5B is a photograph of the VCTS UH-60 Door gunner module in accordance with the embodiments of FIGS. 1, 2, 3, 4, and 4B.

FIG. 5B is a photograph illustrating the overall mechanical design of the UH-60 gunner module 565 according to an embodiment of the invention. The UH-60 gunner module 565 is physically contained by the gunner station 570, which is a custom built enclosure designed to mimic the space constraints that would be experienced by an actual UH-60 door gunner. The opening in the side of the enclosure accurately reflects the size and position of the opening in the actual aircraft. The gunner station 570 includes a seat and harness and space for an electronics rack 555. As with the actual vehicle, the harness is designed such that the door gunner trainee can stand and lean out the opening in the side of the gunner station 570. The head mounted display (HMD) 575 is worn by the door gunner trainee, and the head tracker sensor 580 is mounted on the top of the gunner station 570 along with a video repeater 550. The weapon mock-up 560 is positioned either outside the vehicle on a stand bolted to the floor of the semi-trailer or on an articulating arm mounted to the base of the vehicle opening. The position, heft, feel, and recoil of the weapon mock-up 560 mimics an actual weapon used in the UH-60 aircraft.

Figure 6:
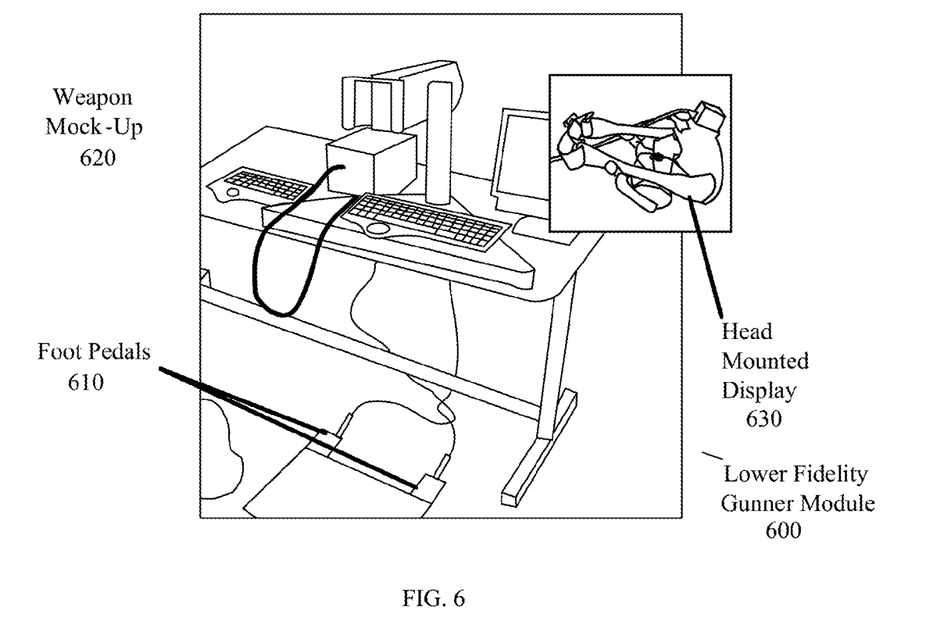
FIG. 6 is a photograph of a Tabletop gunner module in accordance with the embodiments of FIGS. 1, 2, and 3.

FIG. 6 is a photograph of an embodiment of the lower fidelity desktop variant of the ground vehicle gunner module. This version 600 of the ground vehicle gunner module provides all of the functionality of the higher fidelity gunner module described above. Differences include those relating to the fidelity of the device. For example:

The gunner simulates moving a traverse ring using foot pedals 610 and software that moves the weapon mock-up 620 around the simulated ring; the imagery displayed to the gunner on the HMD 630 presents the view that the gunner would see if he moved the traverse ring with his feet and back as he would on the higher fidelity variant of the gunner module.

A lower fidelity HMD 630 is typically used with reduced resolution and with angular tracking only; i.e., only the direction that the gunner's head is pointed is sensed by a head tracker.

While various embodiments of the present invention have been described above, it should be understood that they have been presented by way of example, and not limitation. It will be apparent to persons skilled in the relevant art that various changes in form and detail may be made therein without departing from the spirit and the scope of the invention.

What is claimed is:

1. A computer-based simulation system for training vehicle crew members for operation of a vehicle, the simulation system comprising:
   a plurality of self-contained crewman modules, configured to simulate the operation of the vehicle, configured to be connected to one another by a network, wherein each crewman module comprises:
   a self-contained physical structure configured to provide a position for only an individual crew member, dedicated to a simulation of a single distinct crew station of the vehicle, and configured to operate while geographically separated from at least one other of the plurality of self-contained crewman modules; and
   a mechanical mockup within the self-contained physical structure, configured to dedicate the module to the simulation of the single distinct crew station.

2. The computer-based simulation system of claim 1, wherein the self-contained crewman modules are reconfigurable.

3. The computer-based simulation system of claim 2, wherein reconfigurable involves adding, deleting, or changing the mix of crewman modules.

4. The computer-based simulation system of claim 2, wherein the self-contained crewman modules are reconfigurable to simulate multiple types of vehicles.

5. The computer-based simulation system of claim 2, wherein the self-contained crewman modules are reconfigurable to simulate multiple types of weapons.

6. The computer-based simulation system of claim 1, further comprising an instructor station.

7. The computer-based simulation system of claim 6, wherein the instructor station is configured to function as a replacement of one of the plurality of self-contained crewman modules.

8. The computer-based simulation system of claim 1, wherein the simulation of the single distinct crew station comprises presenting a visual imagery to a vehicle crew member.

9. The computer-based simulation system of claim 8, wherein the visual imagery presented to the vehicle crew member is configured at multiple levels of fidelity.

10. The computer-based simulation system of claim 9, wherein a number of controls presented to the vehicle crew member is proportional to the multiple levels of fidelity.

11. The computer-based simulation system of claim 9, wherein a lower fidelity level presents a subset of capabilities as compared to a higher level of fidelity.

12. The computer-based simulation system of claim 9, wherein a lower fidelity level presents a lower level of visual imagery in terms of field of view, resolution, and scene content.

* * * * *